(No Model.) 2 Sheets—Sheet 1.
W. E. PENN & M. A. GUILD.
COMBINED CHURN AND BUTTER WORKER.
No. 581,133. Patented Apr. 20, 1897.
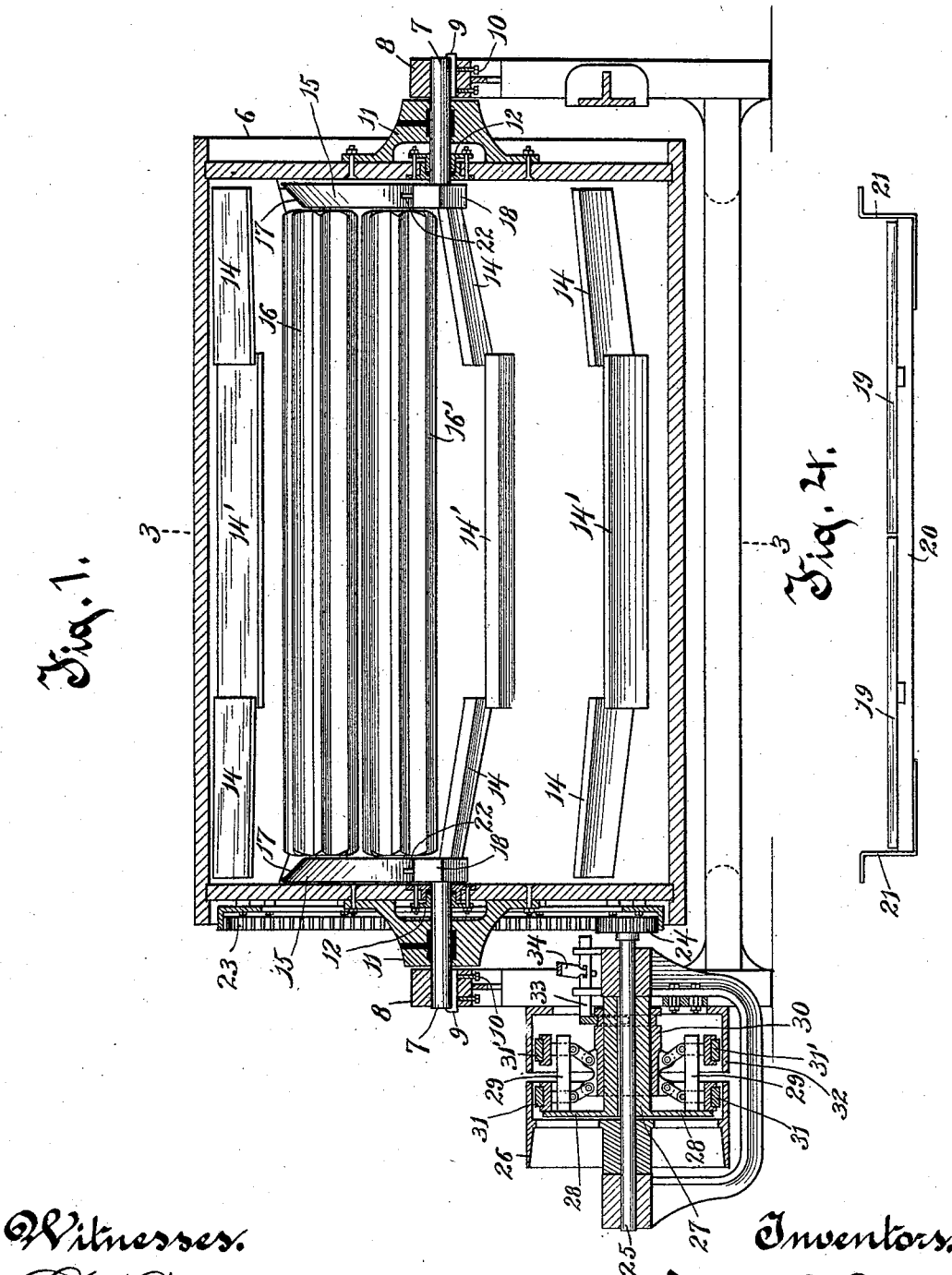
Witnesses.
O. N. Keeney
Anna V. Faust
Inventors.
William E. Penn
Marsten A. Guild
By Benedict & Morsell
Attorneys.

(No Model.) 2 Sheets—Sheet 2.
W. E. PENN & M. A. GUILD.
COMBINED CHURN AND BUTTER WORKER.
No. 581,133. Patented Apr. 20, 1897.
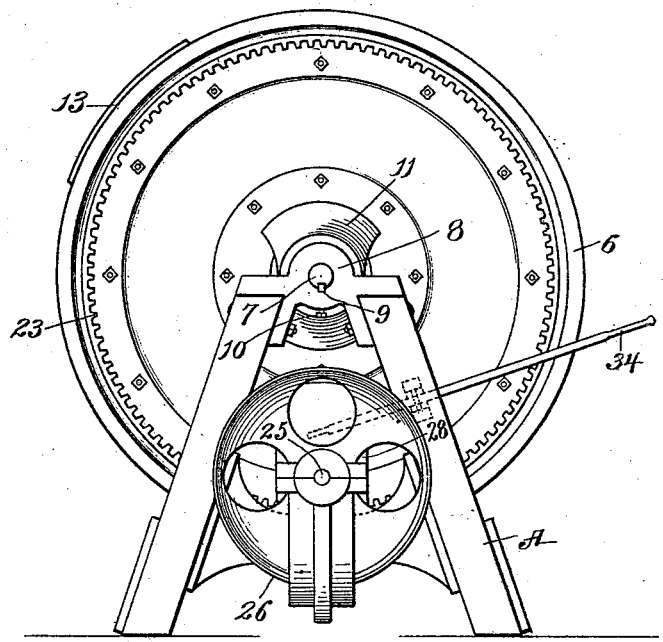
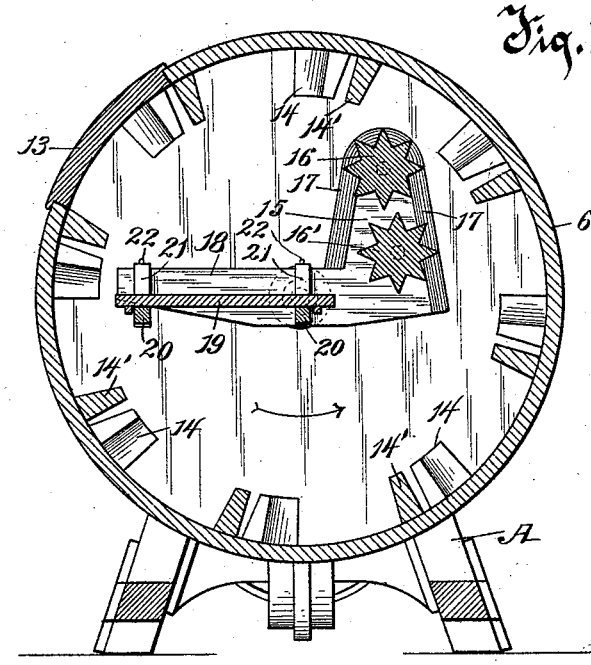
Witnesses.
Inventors.
William E. Penn
Marsten A. Guild
By Benedict & Morsell
Attorneys.

UNITED STATES PATENT OFFICE.

WILLIAM E. PENN AND MARSTEN A. GUILD, OF LAKE MILLS, WISCONSIN, ASSIGNORS TO THE F. B. FARGO & COMPANY, OF SAME PLACE.

COMBINED CHURN AND BUTTER-WORKER.

SPECIFICATION forming part of Letters Patent No. 581,133, dated April 20, 1897.

Application filed January 20, 1897. Serial No. 619,873. (No model.)

*To all whom it may concern:*

Be it known that we, WILLIAM E. PENN and MARSTEN A. GUILD, of Lake Mills, in the county of Jefferson and State of Wisconsin, have invented a new and useful Improvement in Churns and Butter-Workers, of which the following is a description, reference being had to the accompanying drawings, which are a part of this specification.

Our invention relates to a machine adapted to churn and also to work butter.

The object of the invention is to provide improved means of the most simple and inexpensive construction, but of strong and enduring character and capable of being conveniently and easily operated, for both churning cream and working butter.

The object of the invention also includes such a construction and assemblage of the parts as is adapted most easily to handle and operate on the material, either cream or butter, and to secure the best and most satisfactory results, with reference to the material operated on, the relations between the material and the machinery, and the convenience and ease of manipulation by the attendant.

The invention consists of the mechanism and its parts and combination of parts, as hereinafter described and claimed, or their equivalents.

In the drawings, Figure 1 is a longitudinal central section of the complete machine. Fig. 2 is a front elevation of the machine. Fig. 3 is a transverse section on line 3 3 of Fig. 1. Fig. 4 is a detail of the butter-table.

In the drawings, A is the frame, of such suitable size and construction as adapts it for supporting the operative mechanism. A cylindrical drum 6 is revoluble on axles 7 7, mounted non-revolubly on the frame A. These axles are mounted in boxes 8 8 therefor on the frame and are held against revolution therein by keys 9 9, inserted in grooves in the axles and in the boxes, the keys being held in place by set-screws 10 10. The drum is provided with hubs 11 11, secured thereto axially, one at each end, respectively, which hubs support the drum rotatably on the axles 7 7 and bear loosely against the boxes 8 8 and prevent the shifting of the drum endwise. The drums are provided with stuffing-boxes 12 12 about the axles 7 7, forming a suitable water-tight joint about the axles where they pass through the heads of the drums. The drum is also provided with a door 13 in its periphery, the door-aperture being adapted to permit of access to the interior of the drum. Within the drum and secured to the inside of the shell or periphery thereof there are series of ledges or buckets 14 14', adapted for agitating the cream when the machine is used as a churn and for carrying up the butter when the machine is used as a butter-worker. The ledges 14 are in two series, one near each end of the drum, the ledges of each series being arranged at a little distance apart circumferentially, but opposite each other, in sets in the two series and at inclinations to the axis of the drum, the inclination of all the ledges of each series being the same, but the inclinations of the two series being in reverse directions and the inclination in each series being toward the rear with reference to the direction of the rotation of the drum. These ledges in each series extend from near the head of the drum in the general direction of the length of the drum a short distance and terminate in front of the ledges 14', which ledges 14' are also secured to the shell of the drum and extend longitudinally thereof parallel with the axis and are located centrally of the length of the drum a little distance from and at the rear of the inner ends of the ledges 14. By this construction the material in the drum, and especially butter when being worked, is by the revolution of the drum carried upwardly on the ledges and by gravity is caused to move inwardly of the length of the drum from near its ends toward the middle portion of the drum, (longitudinally thereof,) but not sufficiently far to mass it at the center of the drum, it being left to be caught by the long straight central ledges 14', along and on which it is carried upwardly in suitably-distributed form, so as not to be thrown onto the rolls (hereinafter described) in a too bulky mass at the middle of the drum, (longitudinally,) as would occur if the inclined ledges 14 extended to or near to the middle of the drum. Passages are provided between the ends of the ledges 14 and the heads of the drum and between the ends of the ledges 14 and the ledges 14' for the escape of water, brine, or butter-milk therethrough.

The axles 7 are in the same straight line, and each terminates just within the head of the drum, and opposite and complementary radially-extending or eccentric arms or plates 15 15 are fixed one on each axle, and two parallel longitudinal and preferably corrugated rolls 16 16' are mounted revolubly in these radial or eccentric arms 15 15. Both of these idle-rolls 16 16' are located, preferably, above the horizontal plane of the axis of the drum, the roll 16 being located near to the path of the ledges 14 14' and approximately in a plane at an angle of fifty-five degrees above and at one side of the axis of the drum, and the other roll, 16', being located adjacent to but a little below the roll 16 and in a vertical plane a little farther away from the vertical plane of the axis of the drum than the vertical plane of the roll 16 is, as shown in Fig. 3. In working butter the butter first comes in contact with roll 16', where it is flattened and compressed to a thickness corresponding with the distance between outside of roll 16' and the inside surface of the drum, and thence it is carried up under roll 16, where it is further compressed to a thickness corresponding with the distance between roll 16 and the inside surface of the drum, and is then carried over the top of roll 16, where it is discharged from the ledges and falls to the bottom of the drum by gravity and is again carried up under the rolls by the rotation of the drum, this process being continued until the butter is sufficiently worked. The upper edges 17 of the radial plates 15 are preferably beveled off inwardly to adapt them to discharge any butter that may fall thereon inwardly away from the heads of the drum.

When the butter has been sufficiently worked and is to be removed from the drum, it is desirable to have it in a situation where it can be readily got at for taking it out, and for this purpose a platform or butter-table is provided. Horizontally-extending arms 18 18, one at each end of the drum, projecting radially from the axles 7 and preferably and conveniently being integral with the arms or plates 15 15 at the other side of the axles from the plates 15, are adapted to receive and support thereon the removable platform or tables 19 19. A plurality of longitudinally-disposed rods or bars 20 20 are provided at their extremities, respectively, with hangers 21 21, adapted to rest removably on the arms 18 at a distance apart, and on these rods 20 the butter-tables 19 are placed. Pins 22 22 are advisably fixed in the arms 18, which pins are adapted to receive thereon the hangers 21 and prevent their displacement laterally. The rods 20 and the tables 19 thereon are placed in the drum and used only after the butter has been sufficiently worked merely to catch the butter thereon when elevated thereto by the revolution of the drum and for the purpose of removing it from the drum.

For revolving the drum and for locking it in stationary position when desired the following mechanism is provided: An internal ring-gear 23 is fixed on one head of the drum, and a pinion 24 meshes therewith, which pinion is fixed on the shaft 25, journaled in a part of the frame. A driven band-pulley 26 is loose on the shaft 25. A hub 27 is keyed on the shaft and is provided with radially-extending arms 28, having fingers 29 projecting therefrom parallel with the shaft. The hub 27 bears at one end loosely against the frame and at the other end against the hub of the pulley 26 and prevents endwise movement of the pulley. A sleeve 30, loose on the hub 27, carries thereon two sets of clutches 31 31'. The clutches respectively are mounted on the sleeve 30 by reversely-inclined toggle-jointed arms, so disposed that by shifting the sleeve 30 endwise on the hub 27 to the limit of its travel in one direction the clutches 31 will engage the rim of the pulley 26 and lock the shaft 25 to the pulley, so as to compel concurrent revolution therewith, and by shifting the sleeve 30 to the limit of its travel in the other direction the clutches 31' will be put in engagement with an annular rim 32, fixed on the frame, whereby the shaft and the drum will be locked against rotation. When sleeve 30 is shifted to intermediate position, the pulley 26 will rotate loosely on shaft 25, also allowing shaft 25, with pinion 24 and hub 27, having the toggle-jointed arms thereon, to revolve loosely in the rim 32, fixed on the frame, permitting the drum to revolve easily, so it can be rotated to and placed in any position by the operator. The construction and arrangement of the parts are such that the short toggle-jointed arms of the clutches of each set are by the shifting of the sleeve 30 thrown a little beyond the perpendicular, so as thereby to be locked and hold the respective clutches releasably in engagement with the opposing faces of the pulley and the rim 32, respectively. A shifting bar 33, movable endwise in ways therefor on the frame, is provided with furcate fingers riding in an annular groove therefor in the sleeve 30, and a lever-handle 34, pivoted medially on the frame, enters an aperture therefor in the bar 33 and is adapted for shifting the sleeve 30 for starting and stopping the revolution of the drum.

What we claim as our invention is—

1. A churn and butter-worker comprising a frame, fixed axles in a common axial line, a plurality of permanently-located rolls mounted on the axles parallel thereto but eccentrically thereof, a revoluble drum mounted on the axles inclosing the rolls, and means for revolving the drum.

2. The combination, with a frame and parallel rolls permanently located thereon one above the other, of a cylindrical drum provided with longitudinally-extending ledges on its peripheral wall, said drum inclosing said permanently-located rolls in such manner that the rolls are eccentric thereto and so that the ledges will pass near to the upper roll as the drum is revolved.

3. The combination with a frame and parallel rolls permanently located on and eccentric to the axis of axles fixed on the frame, said rolls being both at one and the same side of the axis of the drum but so disposed one above the other that butter passing up under the lower roll is first flattened and compressed and then passing up under the upper roll is further compressed and passes up over the upper roll, of a cylindrical drum revoluble on the axles and inclosing the rolls, longitudinally-disposed ledges on the peripheral wall of the drum adapted to pass near the upper roll as the drum revolves.

4. The combination with a frame and parallel rolls permanently located on and eccentric to the axis of axles fixed on the frame, of a cylindrical drum revoluble on the axles and inclosing the rolls, longitudinally-disposed ledges on the peripheral wall of the drum at distances apart circumferentially said ledges being arranged in series, the buckets of the two end series being set at reverse angles to the axis of the drum and a middle series parallel with the axis at a little distance to the rear of the inclined end series, the several series being non-continuous and provided with passages between them, said ledges being also constructed and arranged to pass near one of the rolls when the drum is revolved.

5. The combination with a frame, of parallel rolls in permanent position one above the other and eccentric to axles secured permanently on the frame the upper roll being in the plane of an oblique angle to the horizontal plane of the axles, and a cylindrical drum inclosing the rolls and revoluble about them on the axles.

6. The combination with a revoluble cylindrical drum, and rolls therein parallel with the axis thereof, of arms projecting horizontally radially from the axis of the drum, and a removable butter table or tables supported on the radial arms and onto which table when in place butter will fall on being elevated and dropped by the revolution of the drum.

7. A means for revolving a drum and holding it stationary, comprising a shaft provided with a pinion, a driven pulley loose on the shaft, a fixed annular rim, a hub keyed on the shaft, a sleeve loose on the hub, sets of clutches mounted on the sleeve one set being adapted to engage the pulley and the other set to engage the fixed rim, said clutches having toggle-jointed arms movable in ways through fingers on the hub, and means for shifting the sleeve.

In testimony whereof we affix our signatures in presence of two witnesses.

WILLIAM E. PENN.
MARSTEN A. GUILD.

Witnesses:
  A. W. GREENWOOD,
  R. RUTHERFORD.